US008694268B2

(12) United States Patent
Karikomi et al.

(10) Patent No.: US 8,694,268 B2
(45) Date of Patent: Apr. 8, 2014

(54) DEVICE AND METHOD OF ADJUSTING CURTAILMENT STRATEGY FOR WIND TURBINE, AND PROGRAM

(75) Inventors: Kai Karikomi, Nagasaki (JP); Shigeto Hirai, Nagasaki (JP); Yoshiyuki Hayashi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 644 days.

(21) Appl. No.: 12/934,081

(22) PCT Filed: Jul. 10, 2009

(86) PCT No.: PCT/JP2009/062624
§ 371 (c)(1),
(2), (4) Date: Sep. 23, 2010

(87) PCT Pub. No.: WO2010/024054
PCT Pub. Date: Mar. 4, 2010

(65) Prior Publication Data
US 2011/0018271 A1 Jan. 27, 2011

(30) Foreign Application Priority Data
Aug. 25, 2008 (JP) .................................. 2008-215769

(51) Int. Cl.
*G01B 3/44* (2006.01)
(52) U.S. Cl.
USPC .......................................................... 702/34
(58) Field of Classification Search
USPC ............................................. 702/34; 416/43
See application file for complete search history.

(56) References Cited

U.S. PATENT DOCUMENTS 8,033,788 B2 * 10/2011 Egedal et al. .................... 416/43
2006/0273595 A1 * 12/2006 Avagliano et al. .............. 290/44

FOREIGN PATENT DOCUMENTS

| CN | 1505734 A | 6/2004 |
|----|-----------|--------|
| CN | 1900513 A | 1/2007 |
| JP | 2004060477 A | 2/2004 |
| JP | 2005098181 A | 4/2005 |
| JP | 2005240785 A | 9/2005 |
| JP | 2006241981 A | 9/2006 |
| JP | 2007146858 A | 6/2007 |
| WO | 2007104306 A1 | 9/2007 |

OTHER PUBLICATIONS

Camp, T.R., et al, Recent Developments in Turbine Site-Suitability Assessment, 2003 EWEC Abstract Book, European Wind Energy Conference and Exhibition, Spain.

(Continued)

*Primary Examiner* — Tung S Lau
*Assistant Examiner* — Xiuquin Sun
(74) *Attorney, Agent, or Firm* — Kanesaka Berner and Partners LLP

(57) ABSTRACT

An object is to suppress reduction of energy production as much as possible while ensuring an expected lifetime. There is provided a device of adjusting a curtailment strategy for a wind turbine, the device including: a fatigue equivalent load calculation unit that calculates a fatigue equivalent load for evaluating a fatigue damage of the wind turbine in a predetermined time period by using load data of the wind turbine; and a setting value update unit that compares the fatigue equivalent load with a reference load determined by an expected lifetime of the wind turbine, and, when a difference between the fatigue equivalent load and the reference load exceeds a predetermined threshold value, updates the condition setting value for the curtailment that is currently employed according to the difference.

9 Claims, 6 Drawing Sheets

(56) References Cited

OTHER PUBLICATIONS

ISR for PCT/JP2009/062624 mailed Aug. 25, 2009.
Taiwan Office Action for Application No. 098126738 mailed Aug. 27, 2012.
Australian Notice of Acceptance for Application No. 6773AUP00 mailed Oct. 24, 2012.
Taiwan Decision to Grant for Application No. 098126738 mailed Dec. 12, 2012.
Decision to Grant a Patent was issued on Mar. 12, 2013 for Japanese Patent Application No. 2008-215769.
Chinese Office Action issued Jul. 4, 2012 for Patent Application No. 200980111301.9.
Notice of Allowance issued Mar. 25, 2013 for Canadian Patent Application No. 2,719,238.
Notification on the grant of patent right issued Jul. 26, 2013 corresponds to Chinese patent application No. 200980111301.9.

\* cited by examiner

FIG. 4

| Case No. | 1 | 2 | 3 | 4 |
|---|---|---|---|---|
| AIR DENSITY | 0.9 | 1 | 1.11 | 1.225 |
| POWER INDEX | 0.05 | 0.1 | 0.2 | 0.3 |
| BLOW UP | −8 | 0 | 8 | 16 |

DEVICE AND METHOD OF ADJUSTING CURTAILMENT STRATEGY FOR WIND TURBINE, AND PROGRAM

RELATED APPLICATIONS

The present application is national phase of International Application Number PCT/JP2009/062624 filed Jul. 10, 2009, and claims priority from, Japanese Application Number 2008-215769, filed Aug. 25, 2008.

TECHNICAL FIELD

The present invention relates to a device and a method of adjusting curtailment strategy for a wind turbine, and a program.

BACKGROUND ART

A fatigue load of a wind turbine set in a wind farm often increases and exceeds a design load depending on an arrangement of the wind turbine and a wind condition, due to a mutual interference between wind turbines. If the wind turbine is operated without taking any measures, a failure in the wind turbine or an incident can possibly occur before a designed lifetime (20 years for a typical wind turbine, for example). Therefore, measures of limiting operating hours by shutting down the wind turbine at a wind speed equal to or slower than a normal cut-out wind speed (25 m/s for a typical wind turbine) in a wind direction in which an influence of the wind turbine interference is large, thereby reducing the fatigue load are commonly taken. This is called a curtailment strategy. When the curtailment strategy is carried out, the operating hours become shorter, and naturally, energy production reduces as well.

Therefore, in order to minimize the loss in energy production, there has been proposed a method of carrying out a preliminary assessment, and determining a condition setting value for the curtailment for the wind turbine to be as appropriate as possible (see Non-Patent Citation 1, for example). By carrying out the preliminary assessment in this manner, it is expected to avoid too much curtailment and ensure desired energy production.

{Citation List}

{Non Patent Literature}

{NPL 1} "Recent Developments in Turbine Site-Suitability Assessment", T. R. Camp and D. V. Witcher, 2003 EWEC Abstract Book, European Wind Energy Conference and Exhibition, 16-19 Jun. 2003 in Madrid, Spain

SUMMARY OF INVENTION

Technical Problem

However, the wind condition and the like predicted in the preliminary assessment often differ from an actual wind condition and the like, and in such cases, there is a possibility that the condition setting value for the curtailment determined in the preliminary assessment has not actually been set to be optimal. For example, if the condition setting value for the curtailment is too large in terms of ensuring the energy production, or too small in terms of the reduction of the fatigue load, there is a problem that the desired energy production cannot be obtained.

The present invention is conceived in order to solve the above problem, and an object of the present invention is to provide a device and a method of adjusting curtailment strategy for a wind turbine, and a program, capable of suppressing reduction of energy production as much as possible while ensuring an expected lifetime.

Solution to Problem

In order to solve the above problem, the present invention adopts means as described below.

A first aspect of the present invention provides a device of adjusting a curtailment strategy for a wind turbine, the device being applied to a wind turbine subject to a curtailment strategy for shutting down an operation of the wind turbine when a wind speed exceeds a predetermined condition setting value, and updating a condition setting value for the curtailment, the device including: a fatigue equivalent load calculation unit that calculates a fatigue equivalent load for evaluating a fatigue damage of the wind turbine in a predetermined time period by using load data of the wind turbine; and a setting value update unit that compares the fatigue equivalent load with a reference load determined by an expected lifetime of the wind turbine, and, when a difference between the fatigue equivalent load and the reference load exceeds a predetermined threshold value, updates the condition setting value for the curtailment that is currently employed according to the difference.

According to this configuration, as the condition setting value for the curtailment that is currently employed is re-examined by measuring a load for each wind turbine at regular intervals after wind turbines are actually constructed, and by comparing the fatigue equivalent load with the reference load determined by the expected lifetime of the wind turbine, it is possible to adjust the condition setting value for the curtailment to an appropriate value according to the fatigue damage after the construction of the wind turbines. With this, it is possible to reduce a frequency of shutdown of the wind turbine due to the curtailment strategy, thereby suppressing reduction of energy production as much as possible while ensuring an expected lifetime.

The device of adjusting the curtailment strategy for the wind turbine can be such that, when the condition setting value for the curtailment is set for each of wind directions that have been set in advance, the fatigue equivalent load calculation unit calculates the fatigue equivalent load for each of the wind directions, and that the setting value update unit compares the fatigue equivalent load with the reference load for each wind direction, and updates the condition setting value for the curtailment that is currently employed for each wind direction according to the difference.

According to such a configuration, it is possible to re-examine the condition setting value for the curtailment for each wind direction, thereby improving accuracy of the curtailment strategy adjustment.

The device of adjusting the curtailment strategy for the wind turbine can be such that the load data is time-series load data, and that by statistically processing the time-series load data in the divided period at every predetermined divided period shorter than the predetermined time period, the fatigue equivalent load in the divided period is obtained, and by integrating the fatigue equivalent load in the predetermined time period, the fatigue equivalent load in the predetermined time period is calculated.

As described above, it is possible to obtain the fatigue equivalent load, for example, by integrating the fatigue equivalent load in the divided period obtained by statistically processing the load data at every predetermined divided period.

The device of adjusting the curtailment strategy for the wind turbine can be, for example, such that the fatigue equivalent load is calculated at every divided period using a mathematical expression below that employs a rain-flow counting method, $$l_{eq,k} = \left( \frac{\sum_i l_i^m n_i}{n_{eq}} \right)^{\frac{1}{m}} \quad (1)$$

where, $l_{eq,k}$ is the fatigue equivalent load in the divided period that is k-th from a beginning of a process in the predetermined time period, $l_i$ is an i-th load range in a fatigue load spectrum, $n_i$ is a cycle number of the i-th load range in the fatigue load spectrum, $n_{eq}$ is a reference equivalent cycle number in the second time period, and m is a slope of an S-N curve of a related material.

The device of adjusting the curtailment strategy for the wind turbine can include a database with which a plurality of wind conditions and estimated loads are associated and can be such that an initial condition setting value for the curtailment is determined by a result of analyzing a wind condition in an area of construction of wind turbines; acquiring an estimated load corresponding to the wind condition from the database; and comparing the acquired estimated load with the reference load.

As described above, by previously preparing the database in which the plurality of wind conditions and the estimated loads are associated, it is possible to acquire the estimated load that corresponds to the wind condition closest to the estimated wind condition from the database and to predict the fatigue damage of the wind turbine based on the estimated load when determining the initial condition setting value for the curtailment in the preliminary assessment. With this, it is possible to estimate the fatigue damage for each wind turbine easily and quickly.

A second aspect of the present invention provides a method of adjusting a curtailment strategy for a wind turbine, the method being applied to a wind turbine subject to a curtailment strategy for shutting down an operation of the wind turbine when a wind speed exceeds a predetermined condition setting value, and updating a condition setting value for the curtailment, the method including: a step of calculating a fatigue equivalent load for evaluating a fatigue damage of the wind turbine in a predetermined time period by using load data of the wind turbine; and a step of comparing the fatigue equivalent load with a reference load determined by an expected lifetime of the wind turbine, and, when a difference between the fatigue equivalent load and the reference load exceeds a predetermined threshold value, updating the condition setting value for the curtailment that is currently employed according to the difference.

A third aspect of the present invention provides a program of adjusting a curtailment strategy for a wind turbine, the program causing a computer to realize a curtailment strategy adjustment applied to a wind turbine subject to a curtailment strategy for shutting down an operation of the wind turbine when a wind speed exceeds a predetermined condition setting value, and updating a condition setting value for the curtailment, the program causing the computer to carry out a process including: a step of calculating a fatigue equivalent load for evaluating a fatigue damage of the wind turbine in a predetermined time period by using load data of the wind turbine; and a step of comparing the fatigue equivalent load with a reference load determined by an expected lifetime of the wind turbine, and, when a difference between the fatigue equivalent load and the reference load exceeds a predetermined threshold value, updating the condition setting value for the curtailment that is currently employed according to the difference.

Advantageous Effects of Invention

The present invention provides an effect of suppressing reduction of energy production as much as possible while ensuring an expected lifetime.

BRIEF DESCRIPTION OF DRAWINGS

FIG. 4 is a diagram illustrating a method of calculating an estimated load in a preliminary assessment.

DESCRIPTION OF EMBODIMENTS

The following describes one embodiment of a device and a method of adjusting curtailment strategy for a wind turbine, and a program, with reference to the drawings.

Figure 1:
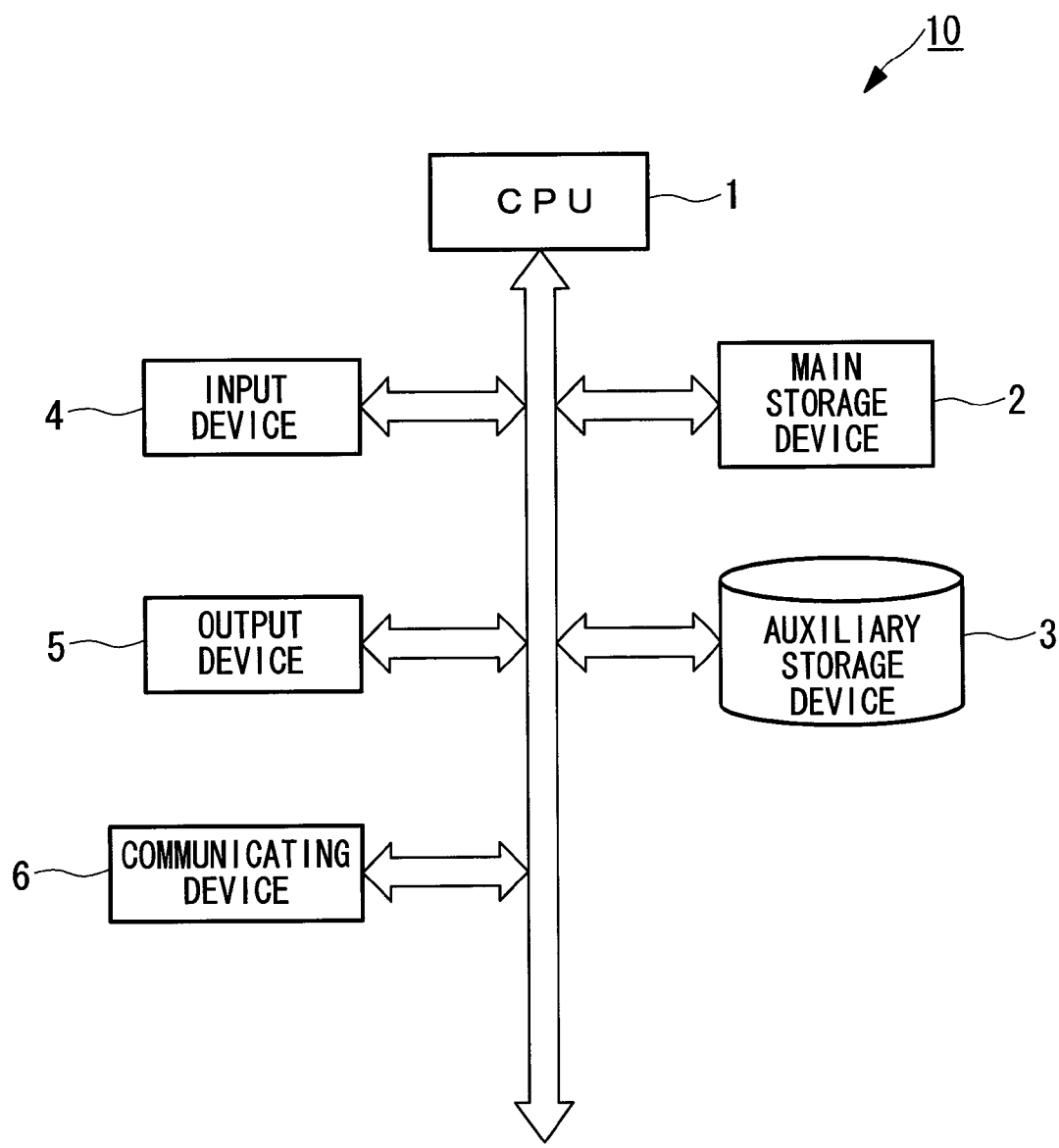
FIG. 1 is a diagram showing a schematic configuration of a device of adjusting a curtailment strategy for a wind turbine according to one embodiment of the present invention.

FIG. 1 is a block diagram showing a schematic configuration of the wind turbine curtailment strategy adjustment device according to this embodiment. Referring to FIG. 1, a wind turbine curtailment strategy adjustment device 10 according to this embodiment is configured as a computer system (computing system), and provided with a CPU (central processing unit) 1, a main storage device 2 such as a RAM (Random Access Memory), an auxiliary storage device 3 such as an HDD (Hard Disk Drive), an input device 4 such as a keyboard or a mouse, an output device 5 such as a monitor or a printer, and a communicating device 6 that communicates with external devices thereby carrying out reception and transmission of information.

The auxiliary storage device 3 stores various programs (a program of curtailment strategy adjustment for wind turbine, for example), and the CPU 1 reads a program from the auxiliary storage device 3, loads the program to the main storage device 2, and executes the program. With this, various processes are realized.

The wind turbine curtailment strategy adjustment device 10 can be provided for each wind turbine, or can be provided for a control room that integrally controls and monitors all or a part of wind turbines constructed in the wind farm.

Figure 2:
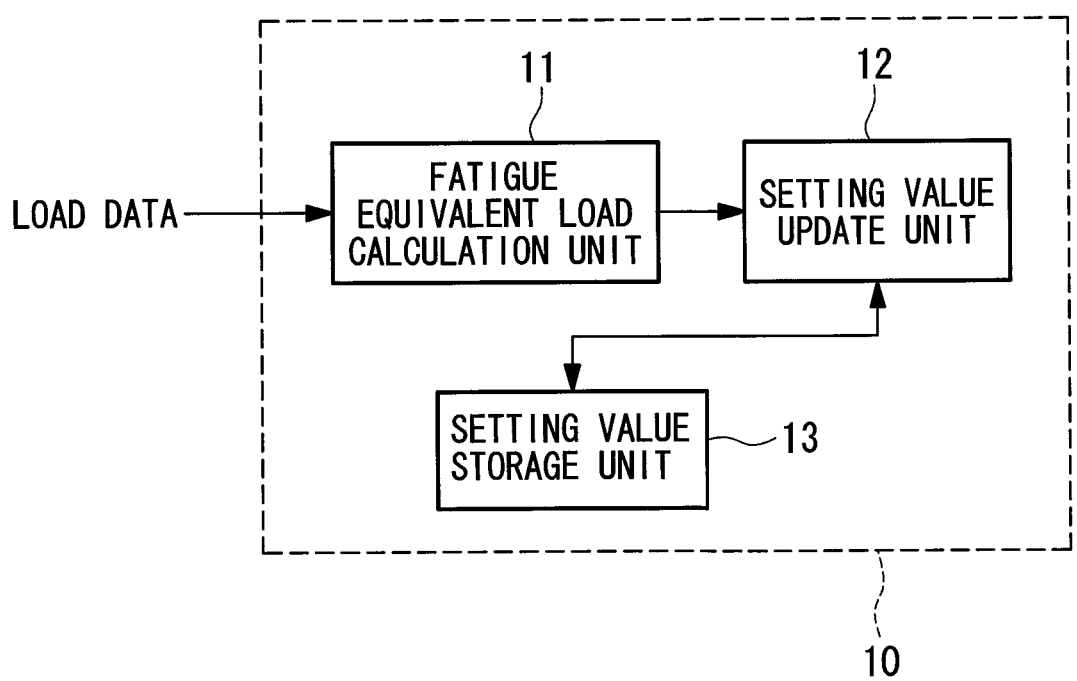
FIG. 2 is a functional block diagram showing functions of the device of adjusting the curtailment strategy for the wind turbine according to the one embodiment of the present invention.

FIG. 2 is a functional block diagram showing functions provided for the wind turbine curtailment strategy adjustment device 10. Referring to FIG. 2, the wind turbine curtailment strategy adjustment device 10 is a device that is applied to a wind turbine subject to a curtailment strategy for shutting down an operation of the wind turbine when the wind speed exceeds a predetermined condition setting value, and updates a condition setting value for the curtailment. The wind turbine curtailment strategy adjustment device 10 is provided with a fatigue equivalent load calculation unit 11, a setting value update unit 12, and a setting value storage unit 13 as main components.

The fatigue equivalent load calculation unit 11 acquires load data outputted from a load sensor attached to the wind turbine, and calculates a fatigue equivalent load for evaluating a fatigue damage of the wind turbine during a predetermined time period using the load data.

The setting value update unit 12 compares the fatigue equivalent load calculated by the fatigue equivalent load calculation unit 11 with an estimated fatigue load used when determining an initial condition setting value for the curtailment, and, when the difference therebetween exceeds a predetermined threshold value, updates a current condition setting value for the curtailment stored in the setting value storage unit 13 according to the difference.

The wind turbine curtailment strategy adjustment device 10 according to this embodiment updates an initial condition setting value for the wind turbine curtailment obtained in a preliminary assessment to an appropriate value according to a magnitude of the fatigue damage of the wind turbine.

In the following, procedures in the preliminary assessment for determining the initial condition setting value for the wind turbine curtailment are first explained, and then procedures realized by the wind turbine curtailment strategy adjustment device 10 according to this embodiment are explained with reference to FIG. 3. Here, the description is given taking an example of a wind farm in which a plurality of wind turbines is constructed.

(Preliminary Assessment)

Figure 3:
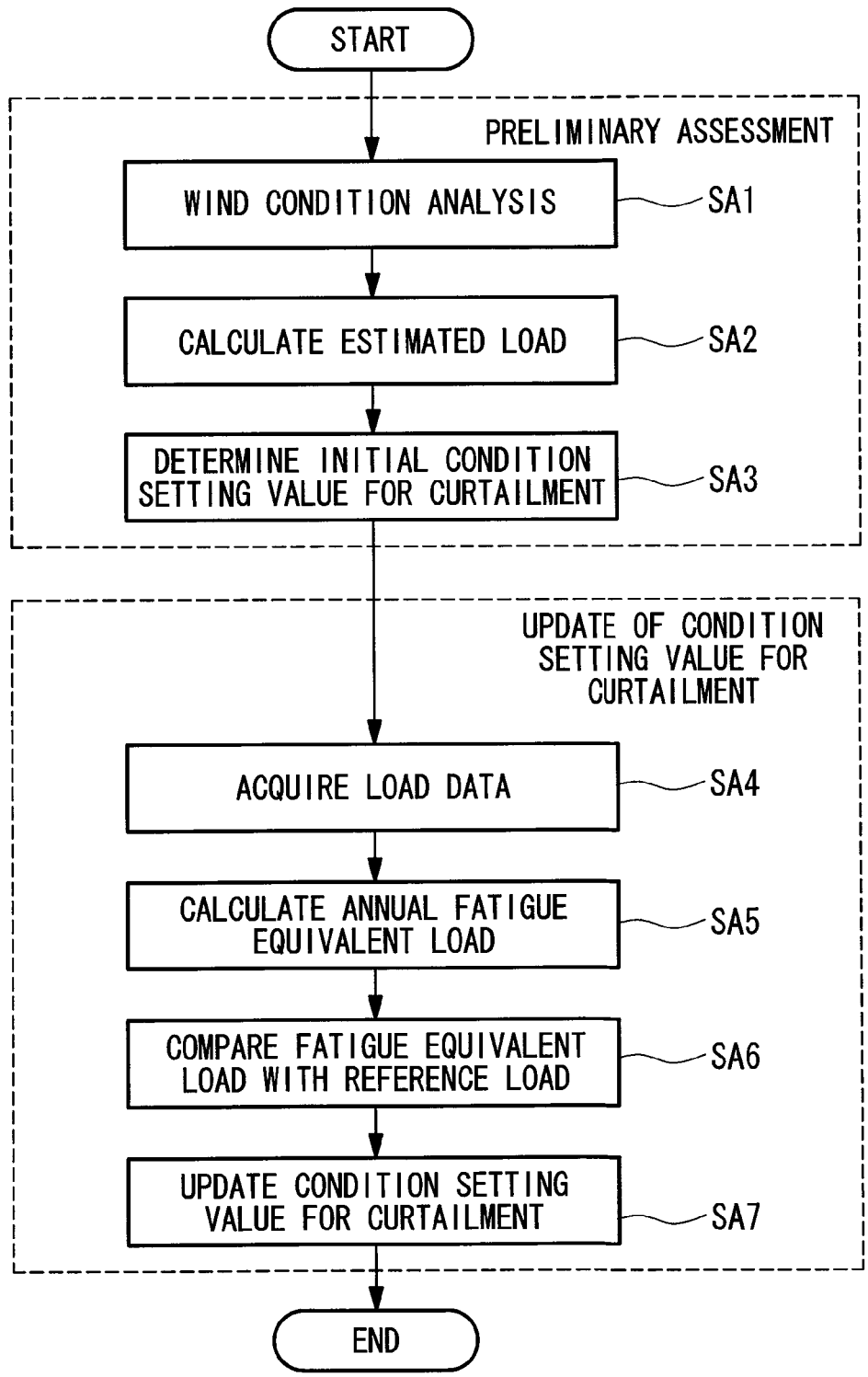
FIG. 3 is a flowchart for explaining a curtailment strategy adjustment method realized by the device of adjusting the curtailment strategy for the wind turbine according to the one embodiment of the present invention.

First, in the preliminary assessment, a wind condition analysis for calculating a wind condition is carried out for each wind turbine to be constructed in the wind farm (Step in FIG. 3). The wind condition analysis is carried out, for example, by actually measured values or numerical calculation, or combination of these. In the wind condition analysis, such as frequency distributions of a wind speed and a wind direction, a turbulence intensity distribution, a upflow angle, a wind shear, a turbulence intensity distribution due to a wind turbine mutual interference (equivalent turbulence intensity) are obtained, for example. Here, the wind shear refers to a vertical distribution of horizontal wind speeds of the wind blowing vertical with respect to the wind turbine.

Next, using a value obtained in the wind condition analysis as input information, the fatigue load is estimated for each wind turbine and for each predetermined wind direction over the predetermined time period (one year, for example (Step SA2 in FIG. 3). Here, the estimated fatigue load is referred to as an estimated load. Further, the estimated load is calculated for each of all-round directions divided by a predetermined division number (16 directions, for example).

As a calculation method of the estimated load, for example, any of the following three methods can be selected and employed.

(Method 1)

Taking an analysis result of the wind condition analysis as an input, the estimated load is calculated by carrying out a time series response calculation for each of the wind turbines that are to be constructed. This method has a problem that enormous processing time is taken for a large-scale wind farm provided with over 100 wind turbines.

(Method 2)

A wind turbine that is estimated to have the largest load among the wind turbines that are to be constructed in the wind farm, that is, a wind turbine that is most affected by a wind turbine interference is empirically selected, the estimated load of this wind turbine is calculated using the method 1, and the calculated estimated load is applied to the rest of the wind turbines.

When this method is used, a wind turbine that is considered to have the largest load is selected according to experience. Accordingly, in a case in which the selection of the wind turbine is not appropriate, there is a possibility that the obtained condition setting value for the curtailment is not set to an appropriate value, and thus a problem of low reliability is involved.

(Method 3)

It is possible to obtain the estimated load for each wind turbine by preparing a database in which various wind conditions and estimated loads are associated, and acquiring an estimated load that is closest to a wind condition result obtained by the wind condition analysis from the database when calculating a load for each wind turbine.

Figure 5:
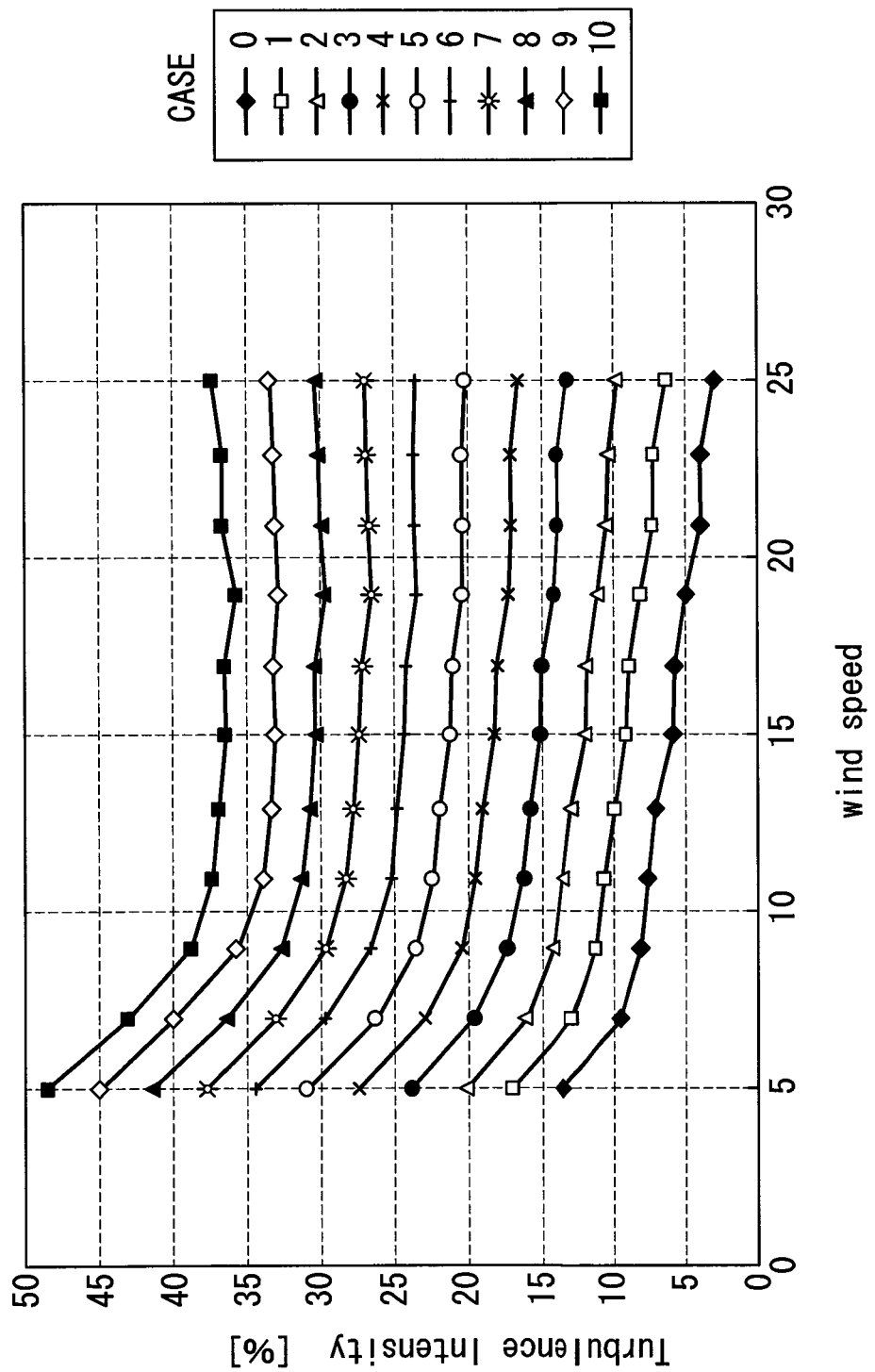
FIG. 5 is a diagram illustrating a method of calculating an estimated load in the preliminary assessment.

Specifically, as shown in FIG. 4 and FIG. 5, a load resulted from a combination of various parameters such as an air density, a wind shear exponent, an upflow angle, and a turbulence intensity obtained by the wind condition analysis is prepared for each wind speed in advance. Then, the estimated load for each wind turbine in a predetermined time period is calculated by acquiring an estimated load for each wind speed of a wind condition parameter that is closest to the wind condition analysis of the corresponding wind turbine from the database, and integrating with the combination of the frequency distributions of the wind speed and the wind direction. When a case that matches the result of the wind condition analysis is not present, it is possible to obtain the estimated load by interpolating an estimated load of a case closest to the result of the wind condition analysis.

The wind shear exponent is a value that is used in the following mathematical expression (1) that defines the wind shear, and corresponds to $\alpha$ in the mathematical expression (1).

$$V(z) = Vo(Z/Zo)^\alpha \quad (1)$$

After the estimated load is obtained for each wind turbine, the condition setting value for the curtailment is subsequently determined for each wind turbine (Step SA3 in FIG. 3).

The initial condition setting value for the curtailment is determined by carrying out the following procedures for each wind turbine.

First, a total amount of the estimated loads calculated for all of the wind directions in Step SA2 is compared with a defined reference load that has been determined by an expected lifetime of the wind turbine. If the total amount of the estimated loads for all of the wind directions does not exceed the reference load, it is determined that the curtailment strategy is unnecessary.

On the other hand, if the total amount of the estimated loads for all of the wind directions exceeds the reference load, the initial condition setting value for the curtailment is determined based on the following procedures.

First, in order to calculate a wind direction in which the load is large due to the wind turbine interference, that is, a wind direction in which the curtailment strategy is required, the estimated load for each wind direction calculated in Step SA2 is compared with the reference load that is set in advance for each wind direction (for example, the load 1.2 times as large as the load in a design wind condition), and a wind direction in which the estimated load exceeds the reference load is specified as a target wind direction for the curtailment.

Next, a wind speed lower than a cut-out wind speed, for example, such as 24 m/s, if a normal cut-out wind speed is 25 m/s is temporarily set as the condition setting value for the curtailment for the target wind direction of the curtailment, and a frequency of the wind speed higher than this is assumed to be zero. Then, the calculation process of the estimated load carried out in Step SA2 is carried out again, and a total of the estimated loads for the all wind directions is again calculated.

Subsequently, the again calculated total of the estimated loads for the all wind directions is compared with the reference load, and if the total of the estimated loads for the all wind directions exceeds the reference load, the condition setting value for the curtailment is temporarily set to a smaller value, and the estimated load is calculated again. Then, the adjustment of the condition setting value for the curtailment is repeated until the total of the estimated loads for the all wind directions is equal to or smaller than the reference load, and a temporary setting value when the total of the estimated loads for the all wind directions is equal to or smaller than the reference load is determined to be the initial condition setting value for the curtailment.

In this manner, after the initial condition setting value for the curtailment is determined for each wind turbine, these values are stored in the setting value storage unit 13 in association with the corresponding wind turbines. At this time, as described above, the initial condition setting value for the curtailment is set for each wind turbine and for each wind direction, and stored in the setting value storage unit 13.

The steps described above are the procedures carried out in the preliminary assessment.

(Adjustment of Curtailment Strategy for Wind Turbine)

Subsequently, after the wind turbines are actually constructed, the initial condition setting value for the curtailment is evaluated by the wind turbine curtailment strategy adjustment device according to this embodiment, and the condition setting value is readjusted at regular intervals so as to be an optimal value.

The following describes a method of the curtailment strategy adjustment for the wind turbine. The following process is carried out for each wind turbine.

First, the fatigue equivalent load calculation unit 11 shown in FIG. 2 acquires the load data outputted from the load sensor attached to the wind turbine (Step SA4 in FIG. 3). The load data is obtained by converting, for example, time-series data acquired by a strain gauge provided for such as a blade, a main shaft, a main bearing, a nacelle, or a tower of the wind turbine into the load data using a predetermined calibration expression. When the wind turbine curtailment strategy adjustment device 10 is provided external to the wind turbine, the load data is transmitted to the main device via a wirelessly or wired communication medium.

The fatigue equivalent load calculation unit 11 calculates the fatigue equivalent load using the load data acquired in Step SA4 (time-series data) every predetermined time period (hereinafter referred to as the "divided period"), for example, every 10 minutes, and for each predetermined wind direction (Step SA5 in FIG. 3). The fatigue equivalent load is calculated using, for example, the following mathematical expression (2) employing a rain-flow counting method.

$$l_{eq,k} = \left( \frac{\sum_i l_i^m n_i}{n_{eq}} \right)^{\frac{1}{m}} \quad (2)$$

Here, $l_{eq,k}$ is a fatigue equivalent load in the divided period that is k-th from the beginning of the process in the predetermined period, $l_i$ is an i-th load range in a fatigue load spectrum, $n_i$ is a cycle number of the i-th load range in the fatigue load spectrum, $n_{eq}$ is a reference equivalent cycle number in a second time period, and m is a slope of an S-N curve of a related material.

Subsequently, the fatigue equivalent load is calculated for each wind direction by integrating the fatigue equivalent load over the predetermined time period (one year, for example). An annual fatigue equivalent load is calculated using the following mathematical expression (3).

$$L_{eq} = \left( \frac{n_{eq} \sum_k l_{eq,k}^m}{N_{eq}} \right)^{\frac{1}{m}} \quad (3)$$

In the mathematical expression (3), $L_{eq}$ is an annual fatigue equivalent load, and $N_{eq}$ is an annual reference equivalent cycle number.

Next, the annual fatigue equivalent load calculated for each wind direction is compared with the reference load determined by the expected lifetime of the wind turbine, and it is determined whether or not the initial condition setting value that has been determined in the preliminary assessment is appropriate based on the results. The initial condition setting value is updated if not appropriate (Steps SA6 and SA7 in FIG. 3).

Specifically, a difference between the fatigue equivalent load calculated for each wind direction and the reference load for each wind direction used in the preliminary assessment is calculated.

Subsequently, it is determined whether or not the difference exceeds the predetermined threshold value that has been set in advance (plus or minus 10% of the fatigue equivalent load, for example), and if the difference exceeds, the initial condition setting value for this wind direction is changed according to the difference.

For example, the initial condition setting value is corrected to be a value smaller by a predetermined amount that has been set in advance for a wind direction whose fatigue equivalent load is greater than the reference load, and the initial condition setting value is corrected to be a value greater by the predetermined amount that has been set in advance for a wind direction whose fatigue equivalent load is smaller than the reference load. The predetermined amount is arbitrarily set. For example, the predetermined amount can be 1 m/s.

Figure 6:
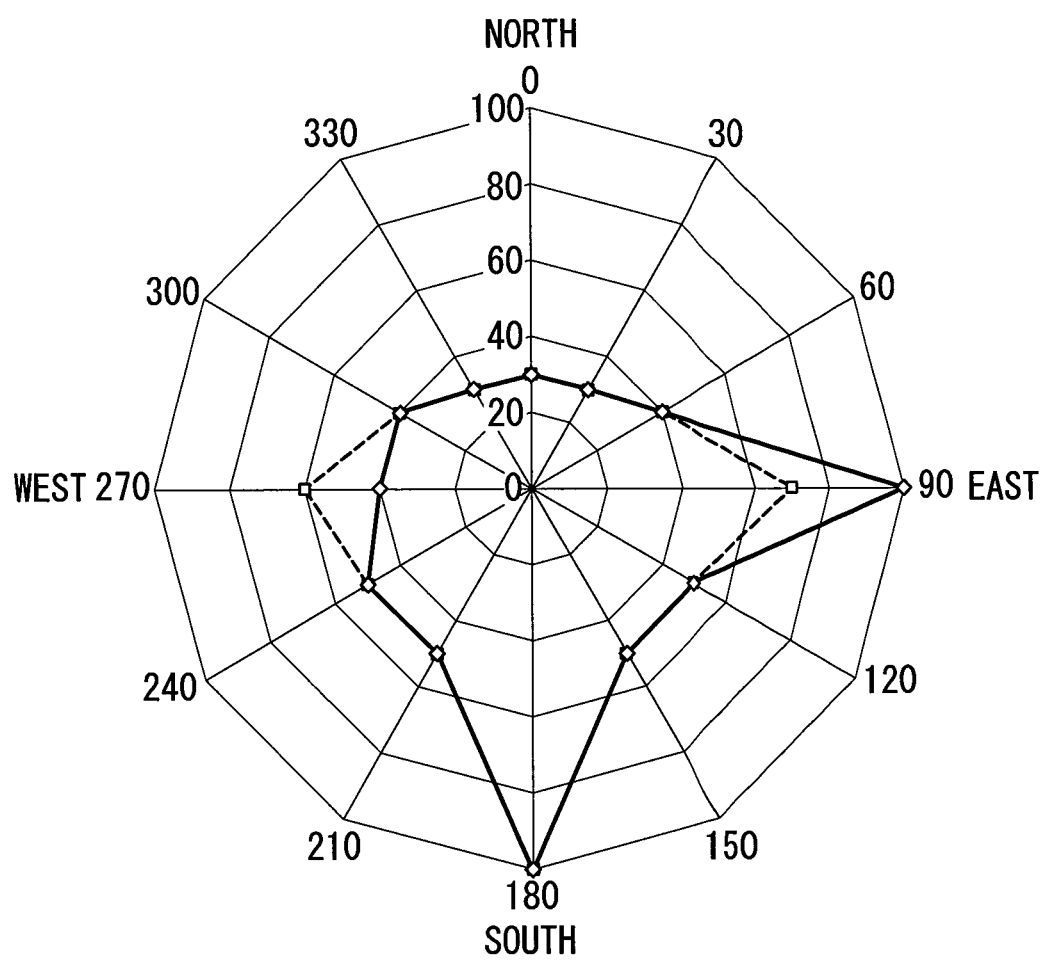
FIG. 6 is a distribution chart showing a fatigue equivalent load and a reference load by comparison.

FIG. 6 shows one example of the comparison between the fatigue equivalent load and the reference load for each wind direction. Referring to FIG. 6, a solid line represents the fatigue equivalent load and a broken line represents the reference load. According to FIG. 6, it is assumed that north is 0°, east is 90°, south is 180°, and west is 270°, and the fatigue equivalent load and the reference load are calculated for each of the 16 directions. In the east and west, the difference between the fatigue equivalent load and the reference load exceeds the threshold value.

Specifically, in the east, the initial condition setting value is corrected to be smaller by the predetermined amount as the fatigue equivalent load exceeds the reference load, and in the west, the initial condition setting value is corrected to be greater by the predetermined amount as the fatigue equivalent load is under the reference load.

When the initial condition setting value is re-examined for each wind turbine in this manner, the initial condition setting value for the curtailment stored in the setting value storage unit 13 is updated to a value after the correction, and in the subsequent curtailment strategy is carried out based on the condition setting value after the correction.

Then, by repeating the procedures from Steps SA4 to SA6 described above every predetermined time period (one year, for example), it is possible to update the condition setting value for the curtailment to be an appropriate value according to the actual fatigue damage of the wind turbine.

As described above, according to the device and the method of adjusting curtailment strategy for a wind turbine, and the program according to this embodiment, after the wind turbines are constructed, the load data of the wind turbine is acquired at regular intervals, the fatigue equivalent load of the wind turbine is obtained based on the load data, and the currently employed condition setting value for the curtailment is re-examined using this fatigue equivalent load. Therefore, it is possible to change the condition setting value for the curtailment to an appropriate value according to the operation of the wind turbine. With this, it is possible to reduce the frequency that the wind turbine is shutdown by the curtailment strategy, thereby suppressing loss of the energy production due to the curtailment strategy while ensuring a durable lifetime.

According to this embodiment, the initial condition setting value for the curtailment that has been determined in the preliminary assessment is stored in the setting storage unit 13, and the preliminary assessment itself is not carried out by the wind turbine curtailment strategy adjustment device. However, a series of the procedures in the preliminary assessment can also be carried out by the wind turbine curtailment strategy adjustment device, for example.

{Reference Signs List}

| | |
|---|---|
| 1 | CPU |
| 2 | Main Storage Device |
| 3 | Auxiliary Storage Device |
| 4 | Input Device |
| 5 | Output Device |
| 6 | Communicating Device |
| 11 | Fatigue Equivalent Load Calculation Unit |
| 12 | Setting Value Update Unit |
| 13 | Setting Value Storage Unit |

The invention claimed is:

1. A method of adjusting a curtailment strategy for a wind turbine, the method being applied to a wind turbine subject to a curtailment strategy for shutting down an operation of the wind turbine when a wind speed exceeds a condition setting value, and updating the condition setting value for the curtailment, the method comprising:
   a step of calculating using a computer a fatigue equivalent load for evaluating a fatigue damage of the wind turbine in a predetermined time period by using load data of the wind turbine; and
   a step of comparing using a computer the fatigue equivalent load with a reference load determined by an expected lifetime of the wind turbine, wherein
   when a difference between the fatigue equivalent load and the reference load is determined, using a computer, to exceed a predetermined threshold value and when the fatigue equivalent load is determined, using a computer, to be greater than the reference load, decreasing the condition setting value for the curtailment that is currently employed, and
   when the difference between the fatigue equivalent load and the reference load is determined, using a computer, to exceed a predetermined threshold value and when the fatigue equivalent load is determined, using a computer, to be smaller than the reference load, increasing the condition setting value for the curtailment that is currently employed.

2. A non-transitory computer readable medium having recorded thereon, a computer program including executable instructions for adjusting a curtailment strategy for a wind turbine, instructions for causing a computer to realize a curtailment strategy adjustment applied to a wind turbine subject to a curtailment strategy for shutting down an operation of the wind turbine when a wind speed exceeds a condition setting value, for updating the condition setting value for the curtailment, and for causing the computer to carry out a process comprising:
   a step of calculating a fatigue equivalent load for evaluating a fatigue damage of the wind turbine in a predetermined time period by using load data of the wind turbine; and
   a step of comparing the fatigue equivalent load with a reference load determined by an expected lifetime of the wind turbine, wherein
   when a difference between the fatigue equivalent load and the reference load exceeds a predetermined threshold value and when the fatigue equivalent load is greater than the reference load, decreasing the condition setting value for the curtailment that is currently employed, and
   when the difference between the fatigue equivalent load and the reference load exceeds a predetermined threshold value and when the fatigue equivalent load is smaller than the reference load, increasing the condition setting value for the curtailment that is currently employed.

3. A device of adjusting a curtailment strategy for a wind turbine, the device being applied to a wind turbine subject to a curtailment strategy for shutting down an operation of the wind turbine when a wind speed exceeds a condition setting value, and updating the condition setting value for the curtailment, the device comprising:
   a fatigue equivalent load calculation unit for calculating a fatigue equivalent load for evaluating a fatigue damage of the wind turbine in a predetermined time period by using load data of the wind turbine; and
   a setting value update unit for comparing the fatigue equivalent load with a reference load determined by an expected lifetime of the wind turbine, wherein
   when a difference between the fatigue equivalent load and the reference load exceeds a predetermined threshold value and when the fatigue equivalent load is greater than the reference load, the setting value update unit decreases the condition setting value for the curtailment that is currently employed, and
   when the difference between the fatigue equivalent load and the reference load exceeds a predetermined threshold value and when the fatigue equivalent load is smaller than the reference load, the setting value update unit increases the condition setting value for the curtailment that is currently employed.

4. The device of adjusting the curtailment strategy for the wind turbine according to claim 3, wherein
   when the condition setting value for the curtailment is set for each of wind directions that have been set in advance, the fatigue equivalent load calculation unit calculates the fatigue equivalent load for each of the wind directions, and the setting value update unit compares the fatigue equivalent load with the reference load for each wind direction, and updates the condition setting value for the curtailment that is currently employed for each wind direction according to the difference.

5. The device of adjusting the curtailment strategy for the wind turbine according to claim 3, wherein the load data is time-series load data, and by statistically processing the time-series load data in the divided period at every predetermined divided period shorter than the predetermined time period, the fatigue equivalent load in the divided period is obtained, and by integrating the fatigue equivalent load in the predetermined time period, the fatigue equivalent load in the predetermined time period is calculated.

6. The device of adjusting the curtailment strategy for the wind turbine according to claim 5, wherein the fatigue equivalent load is calculated at every divided period using a mathematical expression below that employs a rain-flow counting method:

$$l_{eq,k} = \left( \frac{\sum_i l_i^m n_i}{n_{eq}} \right)^{\frac{1}{m}} \quad (1)$$

where, $l_{eq,k}$ is the fatigue equivalent load in the divided period that is k-th from a beginning of a process in the predetermined time period, $l_i$ is an i-th load range in a fatigue load spectrum, $n_i$, is a cycle number of the i-th load range in the fatigue load spectrum, $n_{eq}$ is a reference equivalent cycle number in the divided period, and m is a slope of an S-N curve of a related material.

7. The device of adjusting the curtailment strategy for the wind turbine according to claim 3, the device comprising:

a database for storing a plurality of wind conditions and estimated loads which are associated in advance, wherein the estimated loads are fatigue loads estimated over the predetermined time period by using a value obtained in the wind condition analysis as input information, an initial condition setting value for the curtailment is determined by a result of analyzing a wind condition in an area of construction of wind turbines;

acquiring an estimated load corresponding to the wind condition from the database; and comparing the acquired estimated load with the reference load.

8. The device of adjusting the curtailment strategy for the wind turbine according to claim 3, wherein an initial condition setting value is a value of wind speed lower than a cut-out wind speed, and is a value of a wind speed set so that the estimated load is equal to or lower than the reference load.

9. The device of adjusting the curtailment strategy for the wind turbine according to claim 3, the device comprising:

a database for storing a plurality of wind conditions and estimated loads which are associated in advance, wherein the estimated loads are fatigue loads estimated over the predetermined time period by using a value obtained in the wind condition analysis as input information, an initial condition setting value for the curtailment is determined by a result of analyzing a wind condition in an area of construction of wind turbines;

acquiring an estimated load corresponding to the wind condition from the database; and comparing the acquired estimated load with the reference load.

* * * * *